United States Patent
Peynot

(10) Patent No.: US 12,454,852 B2
(45) Date of Patent: Oct. 28, 2025

(54) FLAP SYSTEM FOR A HANDLE ARRANGEMENT

(71) Applicant: U-shin Italia S.p.A, Pianezza (IT)

(72) Inventor: Thomas Peynot, Pianezza (IT)

(73) Assignee: U-shin Italia S.p.A, Pianezza (IT)

( * ) Notice: Subject to any disclaimer, the term of this patent is extended or adjusted under 35 U.S.C. 154(b) by 261 days.

(21) Appl. No.: 18/311,503

(22) Filed: May 3, 2023

(65) Prior Publication Data

US 2023/0358079 A1   Nov. 9, 2023

(30) Foreign Application Priority Data

May 3, 2022   (EP) ..................................... 22171448

(51) Int. Cl.
| | | |
|---|---|---|
| E05B 77/06 | (2014.01) | |
| E05B 77/04 | (2014.01) | |
| E05B 85/10 | (2014.01) | |
| E05B 85/16 | (2014.01) | |

(52) U.S. Cl.
CPC .............. *E05B 77/06* (2013.01); *E05B 77/04* (2013.01); *E05B 85/103* (2013.01); *E05B 85/107* (2013.01); *E05B 85/16* (2013.01)

(58) Field of Classification Search
CPC .......... E05B 77/02; E05B 77/04; E05B 77/06; E05B 85/103; E05B 85/107
See application file for complete search history.

(56) References Cited

U.S. PATENT DOCUMENTS

| | | | | |
|---|---|---|---|---|
| 10,954,702 B2* | 3/2021 | Couto Maquieira | ... | E05B 81/16 |
| 11,624,213 B2* | 4/2023 | Guerin | ................... | E05B 85/103 |
| | | | | 292/336.3 |
| 11,639,619 B2* | 5/2023 | Han | ....................... | E05B 85/103 |
| | | | | 292/336.3 |

(Continued)

FOREIGN PATENT DOCUMENTS

| | | |
|---|---|---|
| WO | WO 2015/068422 A1 | 5/2015 |
| WO | WO 2017/070307 A1 | 4/2017 |

OTHER PUBLICATIONS

European Search Report issued Sep. 27, 2022 in European Application 22171448.8 filed on May 3, 2022, citing documents 1-6, 15-16 therein, 7 pages (with Written Opinion).

*Primary Examiner* — Kristina R Fulton
*Assistant Examiner* — Noah Horowitz
(74) *Attorney, Agent, or Firm* — Oblon, McClelland, Maier & Neustadt, L.L.P.

(57) ABSTRACT

A flap system for impairing with an undesired deployment of a handle of a handle arrangement of a motor vehicle includes: a body, an axle and a reversibly deformable member, the body being rotatable around the axle and including a flap and a driving member, the flap system tilting about the axle between a blocking configuration and a disengaged configuration. The reversibly deformable member maintains the flap system in the blocking configuration, the flap system moving to the disengaged position by actuation of the driving member triggering the deformation of the reversibly deformable member and the rotation of the body around the axle. When the flap system is mounted in the handle arrangement, the flap, in the disengaged position, is spaced apart from the handle to allow its deployment and, in the blocking configuration, faces the handle to prevent its deployment.

11 Claims, 6 Drawing Sheets

(56) References Cited

U.S. PATENT DOCUMENTS

| | | | |
|---|---|---|---|
| 11,643,855 B2* | 5/2023 | Och | E05B 77/06 |
| | | | 292/336.3 |
| 11,679,651 B2* | 6/2023 | Couto Maquieira | B60J 5/0416 |
| | | | 292/336.3 |
| 11,692,377 B2* | 7/2023 | Casal Gomez | E05B 85/107 |
| | | | 292/216 |
| 11,725,432 B2* | 8/2023 | Guerin | E05B 81/42 |
| | | | 70/208 |
| 11,879,276 B2* | 1/2024 | Toyama | B60J 5/0468 |
| 11,926,196 B2* | 3/2024 | Toyama | B60J 5/04 |
| 12,203,299 B2* | 1/2025 | Kim | E05B 81/54 |
| 12,241,290 B2* | 3/2025 | Toyama | E05B 85/16 |
| 2016/0273247 A1 | 9/2016 | Fujiwara | |
| 2018/0171686 A1 | 6/2018 | Couto Maquieira et al. | |
| 2018/0274271 A1 | 9/2018 | Och et al. | |
| 2020/0190865 A1 | 6/2020 | Guerin et al. | |
| 2020/0318397 A1 | 10/2020 | Couto Maquieira et al. | |

* cited by examiner

A

B

A

B

A

B

FLAP SYSTEM FOR A HANDLE ARRANGEMENT

BACKGROUND OF THE INVENTION

Field of the Invention

The invention relates to a flap system for a handle arrangement of a motor vehicle, in particular in the case of flush handles.

Description of the Related Art

Flush handles of motor vehicles are designed to fit with the surface of the door panel at the rest position, resulting in an improved aerodynamism and a better visual for the user.

Accordingly, flush handles require an action from the user, like a mechanical input on one extremity of the handle or an electronic signal, to move from a stowed position to a deployed position wherein the user will be able to grab and pull it to an operative position granting physical access to the vehicle.

However, during a crash accident of the motor vehicle, while the user does not provide any action to deploy the handle nor unlatch the door, the door can undesirably be unlatched because of the inertial force resulting from the displacement of the motor vehicle applied to the handle arrangement mechanism, exposing the user to potential outside injuries.

BRIEF SUMMARY OF THE INVENTION

Thus, one object of the invention is to provide a system impairing with an undesired deployment of a flush handle.

To this end, the invention relates to a flap system for impairing with an undesired deployment of a handle arrangement of a motor vehicle, the flap system comprising a body, an axle and a reversibly deformable member, the body being rotatable around the axle and comprising a flap and a driving member,
  the flap system tilting about the axle between a blocking configuration and a disengaged configuration, the reversibly deformable member maintaining the flap system in the blocking configuration, the flap system moving to the disengaged position by actuation of the driving member triggering the deformation of the reversibly deformable member and the rotation of the body around the axle,
  wherein when the flap system is mounted in the handle arrangement the flap, in the disengaged position, is spaced apart from the handle to allow its deployment and, in the blocking configuration, faces the handle to prevent its deployment.

The flap system of the invention allows impairing with an undesired deployment of the handle, notably in case of a crash of a motor vehicle. The flap blocks the handle during its deployment path in case this deployment was not triggered by the user (mechanically or electrically). In case of a desired deployment of the handle by the user, the flap system is moved from the blocking configuration to the disengaged configuration, spacing the flap apart from the deployment path of the handle and letting the latter freely move from a stowed position to a deployed position.

By "undesired deployment of the handle", it is meant a deployment of the handle from the stowed position to the deployed position which has not been triggered by an input from the user and it is then not intended, like in particular in a lateral crash accident.

In one embodiment of the invention, the driving member may be arranged to cooperate with a deployment system of the handle arrangement for actuating the titling of the flap system from the blocking configuration to the disengaged configuration when the flap system is mounted in the handle arrangement.

Notably, the driving member can be arranged to cooperate with a push lever of the deployment system.

In another embodiment of the invention, the reversibly deformable member may be arranged to cooperate with a bracket of the handle arrangement when the flap system is mounted in the handle arrangement.

In one embodiment of the invention, the reversibly deformable member is for example configured to resist to an acceleration of the body rotation about the axle up to 300 m/s$^2$.

In one embodiment of the invention, the reversibly deformable member can be a helical coil spring.

Notably, the body comprises a retention member and one extremity of the helical coil spring is arranged in the said retention member, notably, the retention member extends along with the driving member.

In one embodiment of the invention, the flap and/or the driving member is "L" shaped.

In one embodiment of the invention, the body has a core member which is hollow tube shaped and cooperates with the axle, the flap and/or the driving member extending from the core member.

Notably, the flap and the driving member extend orthogonally from the core member of the body.

The invention also relates to a handle arrangement of a motor vehicle comprising a flap system as defined above.

Notably, the handle arrangement comprises:
  a rotatably mounted handle moving from a stowed position, a deployed position and an operative position in which the handle causes the unlatch of a door,
  wherein the handle comprises a counter-engaging member
  wherein the flap, in the blocking configuration of the flap system, faces the counter-engaging member causing the handle to be blocked in its stroke of rotation from the stowed position to the deployed position by the contact between the counter-engaging member and the flap,
  and wherein the flap, in the disengaged configuration of the flap system, is spaced apart from the counter-engaging member allowing the handle to move from the stowed position to the deployed position.

Particularly, the flap system is arranged to move from the blocking configuration to the disengaged configuration when the flap is pushed by the counter-engaging member of the handle returning from the deployed position to the stowed position.

In particular, the handle arrangement further comprises a deployment system configured to cause the tilting of the flap system from the blocking configuration to the disengaged configuration by cooperation with the driving member.

Notably, the deployment system comprises a push lever, a steering lever and a front lever, each pivotable about a respective axle,
  the handle being fixed to the front lever by a front extremity and being rotatable about the front lever, the steering lever being arranged to push against the handle to make the latter pivot about the front lever and move from the stowed position to the deployed position, the push lever comprising an engaging arm for preventing, in the stowed position, the steering lever to push against the handle, the engaging arm being spaced apart from the steering lever to let the handle moving from the stowed position to the deployed position, wherein the engaging arm of the push lever comprises a housing into which the driving member is arranged, wherein the flap system rotates forward about the axle to move from the blocking configuration to the disengaged configuration and backwards to return from the disengaged configuration to the blocking configuration, wherein, in the blocking configuration, the driving member faces a wall of the housing preventing the flap system to rotates backwards about the axle, and wherein the said wall of the housing engages and pushes against the driving member when the engagement arm is spaced apart from the steering lever, causing the flap system to move from the blocking configuration to the disengaged configuration.

BRIEF DESCRIPTION OF THE SEVERAL VIEWS OF THE DRAWINGS

The invention will be better understood in view of the following description, referring to the annexed figures in which:

FIG. 1 represents two views of a flap system according to a first embodiment of the invention, wherein FIG. 1A is an exploded view and FIG. 1B is a lateral view.

FIG. 2A is perspective view and FIG. 2B shows the said flap system mounted in a handle arrangement.

FIG. 3 represents two views of a handle arrangement comprising the flap system of FIG. 2 and a handle in a stowed position, wherein FIG. 3A is a perspective view and FIG. 3B is a sectional and detailed view of the flap system.

FIG. 4 represents two views of a handle arrangement comprising the flap system of FIG. 2 and a handle in an activating position, wherein FIG. 4A is a perspective view and FIG. 4B is a sectional and detailed view of the flap system.

FIG. 5 represents two views of a handle arrangement comprising the flap system of FIG. 2 and a handle in a deployed position, wherein FIG. 5A is a perspective view and FIG. 5B is a sectional and detailed view of the flap system.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments. Front, rear, left, right, longitudinal, up, down, interior and exterior are considered relating to the motor vehicle orientation in which the flap system and the handle arrangement of the invention are intended to be implemented.

The invention relates to a compact flap system (1, 1') comprising a body 3, an axle 5 and a reversible deformable member 7.

Figure 3:
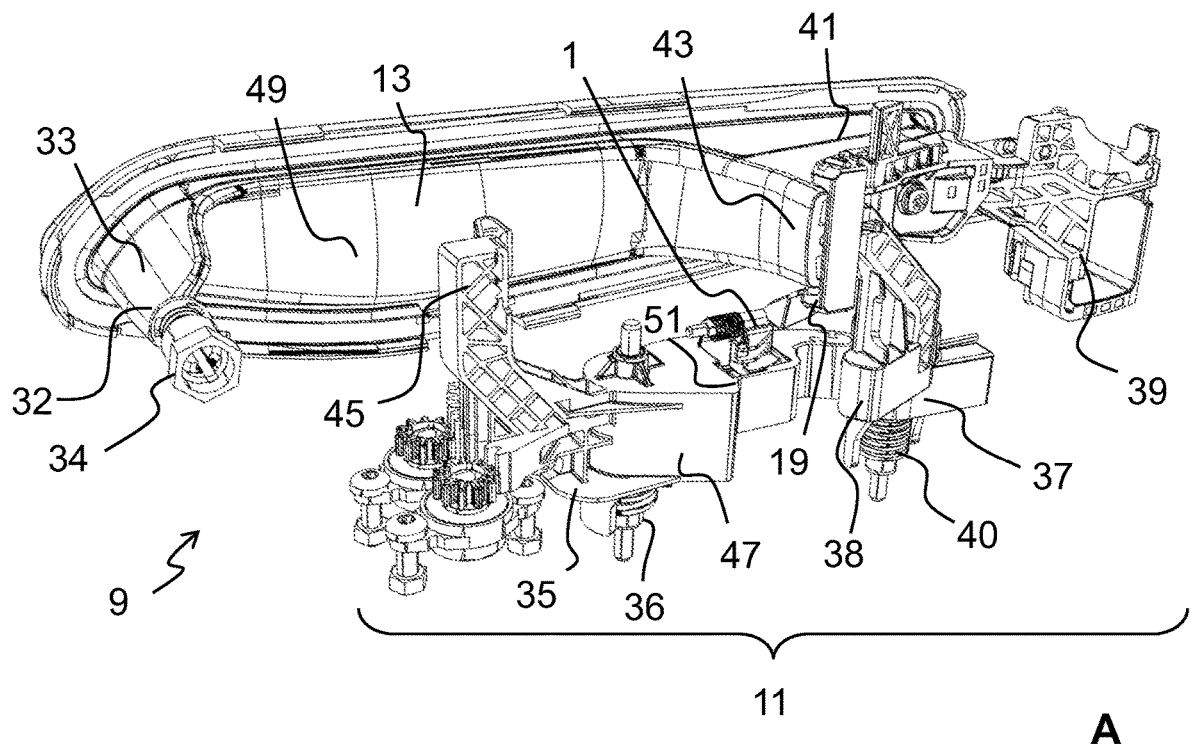
Figure 3:
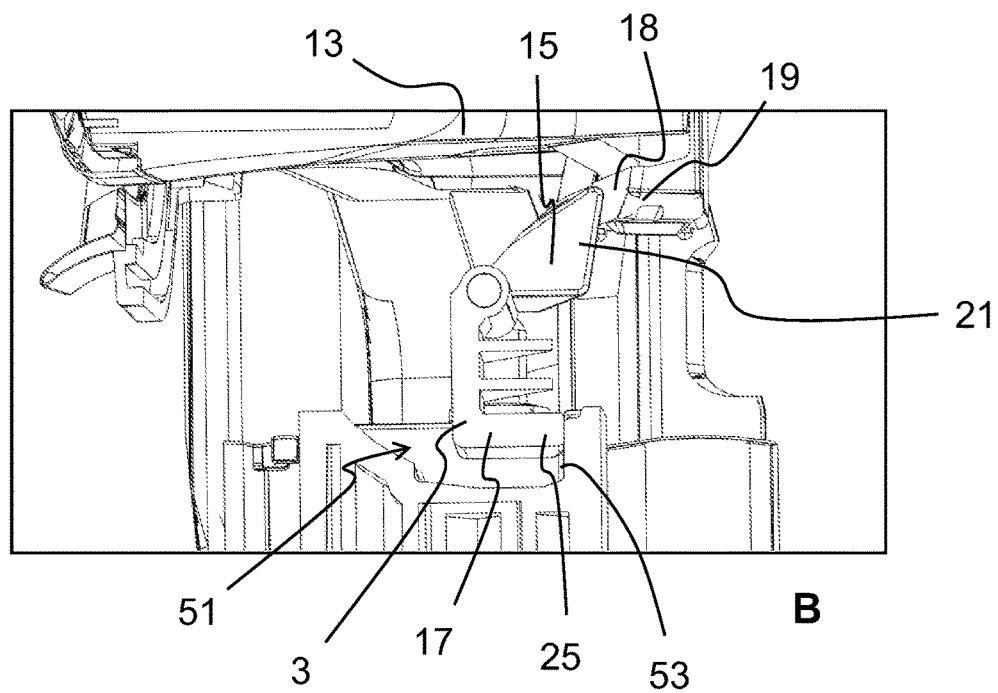
Figure 4:
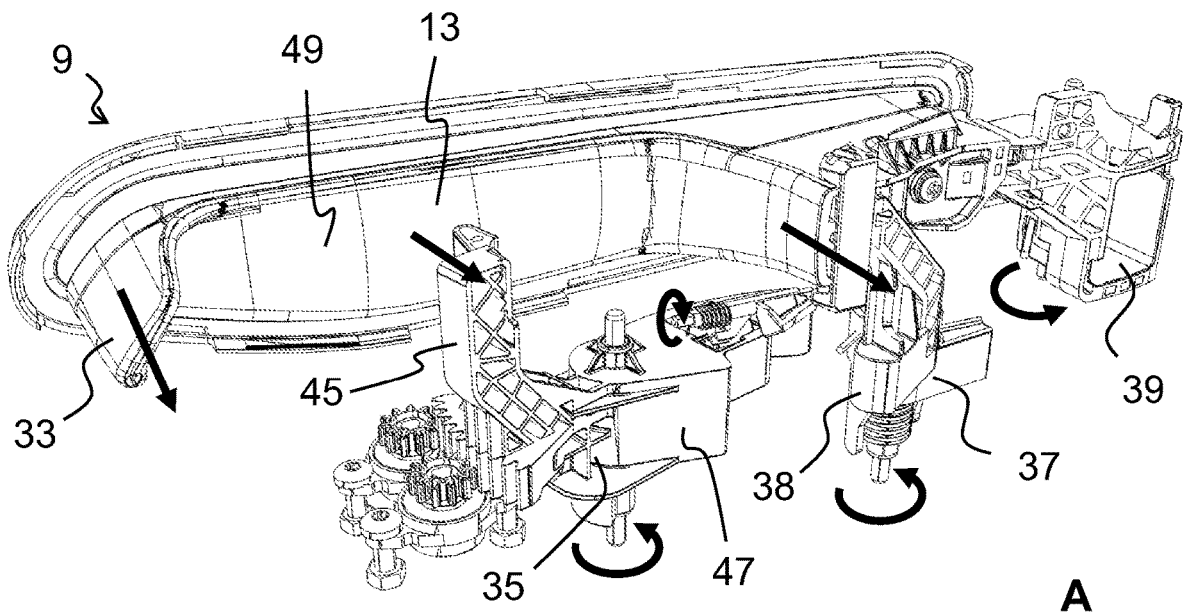
Figure 4:
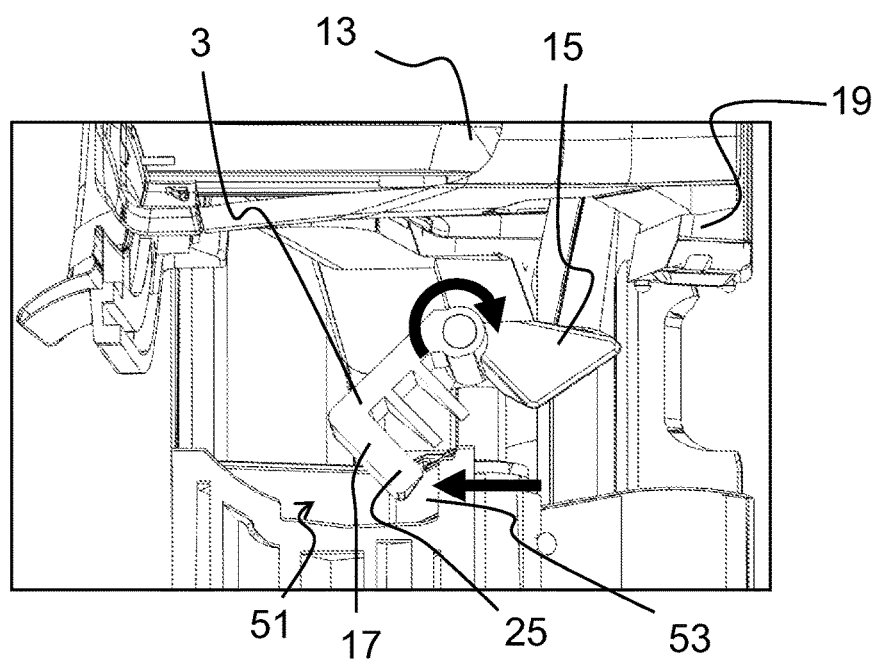
Figure 5:
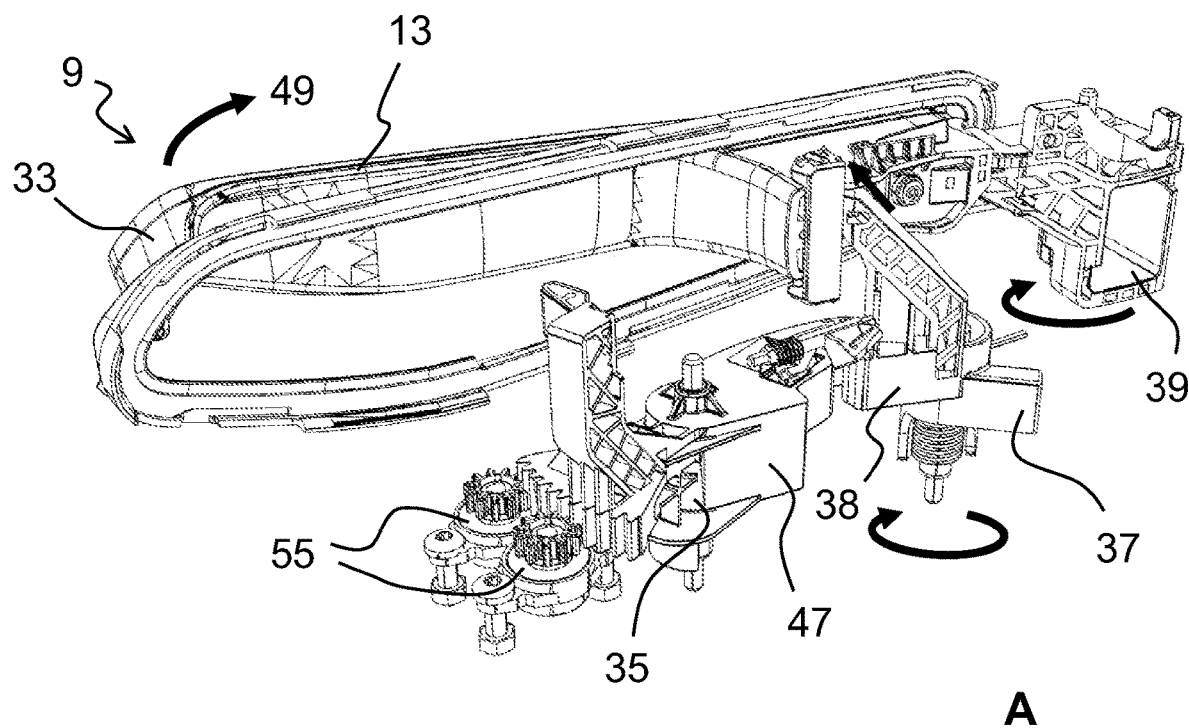
Figure 5:
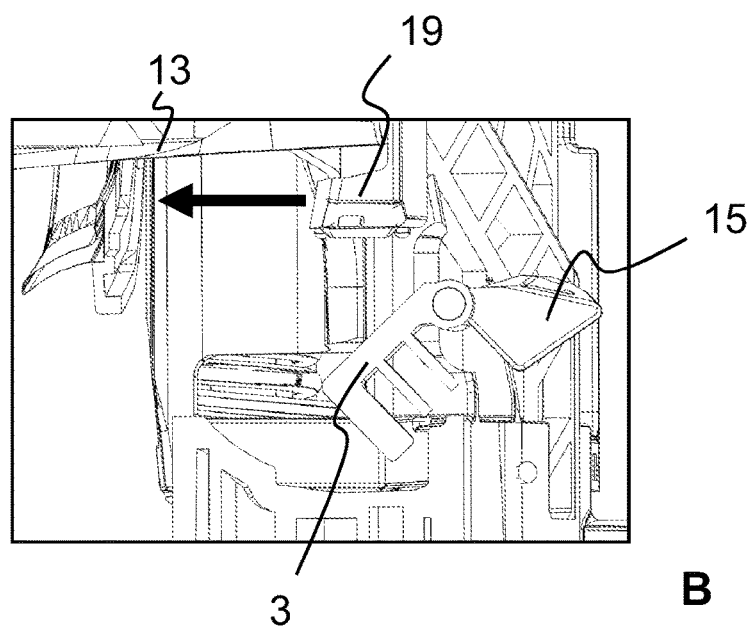

The invention also relates to a handle arrangement 9 for a motor vehicle represented for example in FIG. 3, 4 or 5 comprising such a flap system 1'.

The flap system (1, 1') is arranged in a bracket 4 of the handle arrangement 9 and cooperates with elements of a deployment system 11 of a handle 13 for impairing with an undesired deployment of the said handle 13. The handle 9 can move between a stowed position (FIG. 3A), a deployed position (FIG. 5A) and an operative position (not represented) in which it actuates a latch so as to unlatch the vehicle door.

In the stowed position (FIG. 3A), handle 9 is flushed with the surface of a vehicle door panel and cannot be grabbed by a user of the motor vehicle. Upon an input (mechanical or electrical) from the user, for example a push on a rear extremity 33 of the handle 13, the latter is then moved from the stowed position (FIG. 3) to the deployed position (FIG. 5A) by the deployment system 11.

Upon a mechanical push on the rear extremity 33 of the handle 13, the handle may move from the stowed position to the deployed position via an intermediate position (FIG. 4A) in which the handle 13 activates a deployment system 11. The deployment system 11 may comprise a push lever 35, a steering lever 37 and a front lever 39, each pivotable about a respective axle fixed to the bracket 4. The handle 13 may comprise a free rear end 33 and a front end 41, the latter being connected to the front lever 39 so that the handle 13 is rotationally moveable about the front lever 39.

The push 35 and steering 37 levers are actuation mechanisms. The mechanical input on the rear extremity 33 of the handle 13 moves rotationally the push lever 35 from a rest position, in which it prevents the rotation of the steering lever 37, to an active position, in which it enables the steering lever 37 to rotate and urge the handle 13 toward the deployed position.

In the deployed position (as represented in FIG. 5A), handle 13 is moved outwardly with respect to the door panel, enabling the user to access to a grabbing part 49 of the handle 13. The grabbing part 49 of the handle 13 extends between the free rear end 33 and the front end 41 and allows the user to grab and tear the handle 13 from the deployed position to the operative position to unlatch the door.

The role of the flap system 1 is to prevent the rotation of the handle 13 about the front lever 39 when the push lever 35 has not been activated in its rest position.

Figure 1:
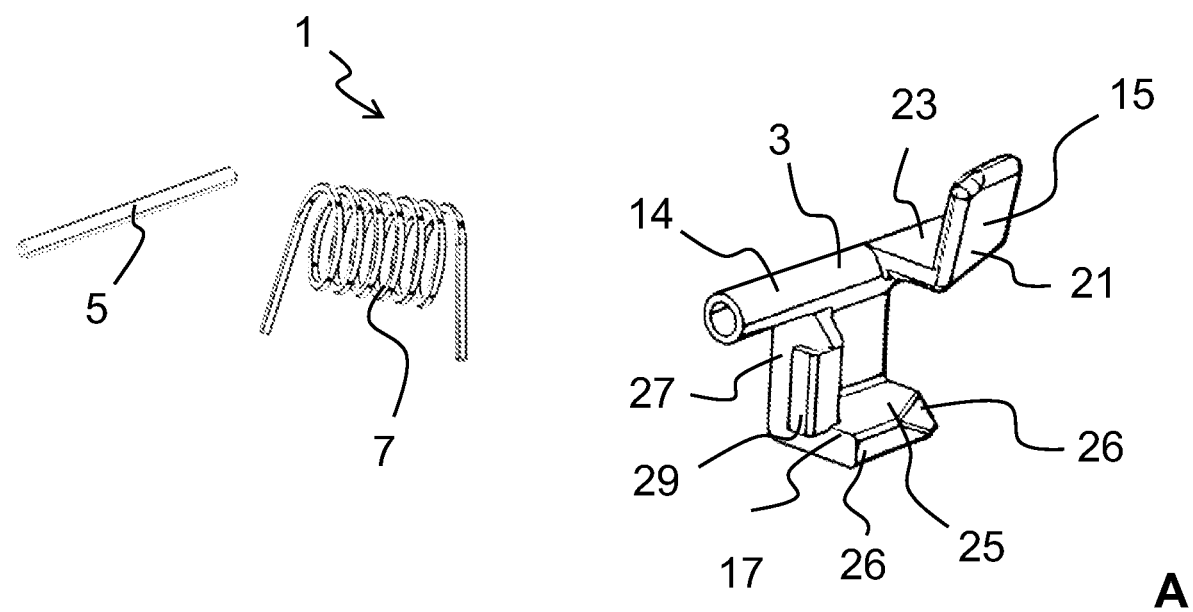
Figure 1:
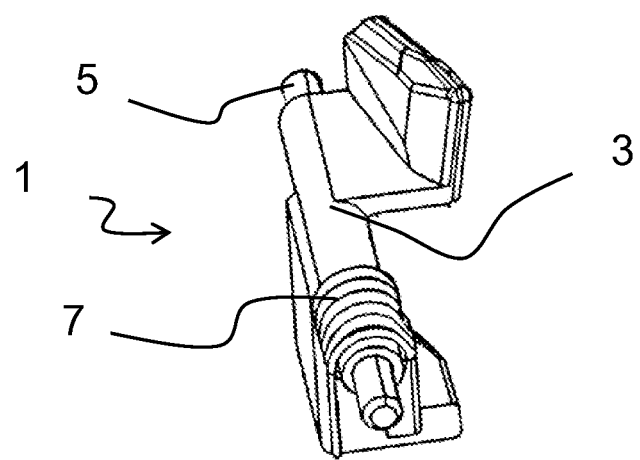
Figure 2:
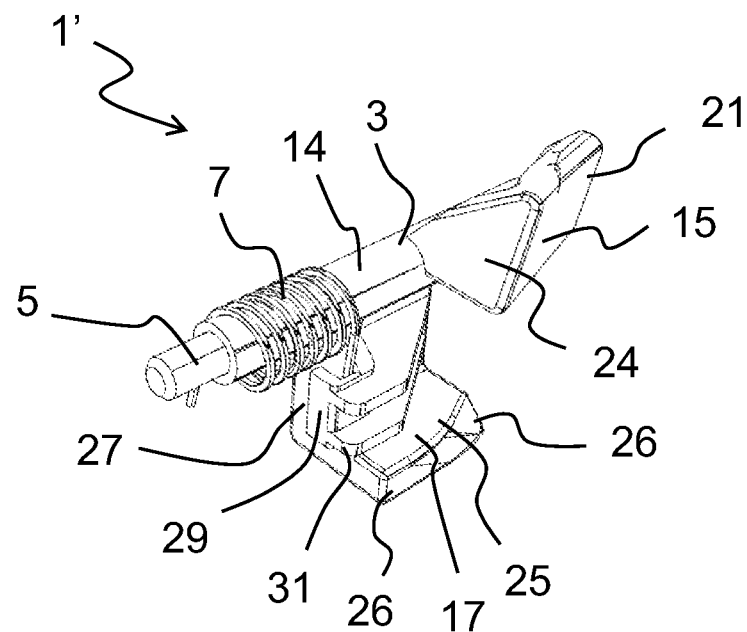
FIG. 2 represents two views of a flap system according to a second embodiment of the invention.
Figure 2:
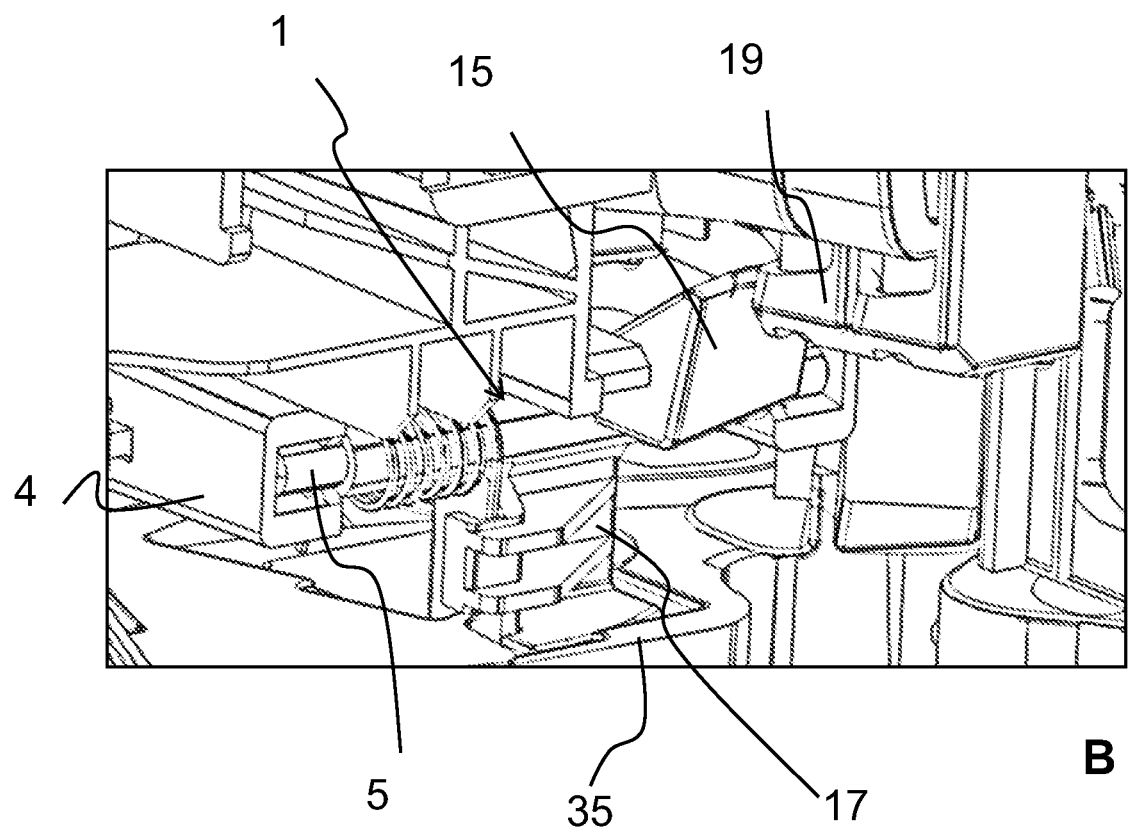

Hereafter are described two embodiments of the flap system 1, 1' represented in FIGS. 1 and 2, wherein the second embodiment of the flap system 1' further comprise reinforcement members with regard to the first embodiment.

The flap system 1, 1' is fixed to the bracket 4 of the handle arrangement 9 by the two extremities of axle 5 (FIG. 2B). The flap system 1 tilts about the axle 5 between a blocking configuration, wherein it prevents the undesired deployment of handle 13 from the stowed position to the deployed position, and a disengaged position, wherein the handle is freed to move from the stowed position to the deployed position.

More specifically, body 3 may comprise a hollow tube shaped member 14 arranged around the axle 5 which therefore passes through the hollow tube shaped member 14, as represented in FIGS. 1 and 2. The reversible deformable member 7 is for example a helicoidal spring wound around the hollow tube shaped member 14 and pre-stressed in such a way to maintain body 3 in a rest position relative to axle 5 and prevent its rotation about it when no forces are applied to body 3. The rest position of body 3 defines the blocking configuration of the flap system 1. A push on handle 13 drives a push lever 35 which triggers the rotation of body 3 about the axle 5 and moves the flap system 1 from the blocking configuration to the disengaged configuration. When the push lever 35 rotates back to the rest position, it enables the reversible deformable member 7 to relax and passively returns to the above mentioned pre-stressed configuration and drives the flap system 1 back to the blocking configuration.

As shown in FIGS. 1 and 2, body 3 comprises a flap 15 and a driving member 17 which are realized for example in one piece with the hollow tube shaped member 14 and extend from the skirt of member 14.

In the blocking configuration, the flap 15 faces a counter-engaging member 19 (see FIG. 2B) of the handle 13 to avoid an undesirably deployment of the latter. To that end, the flap 15 may directly engage the counter-engaging member 19 or be placed on its way of displacement when handle 13 is in the stowed position. Direct engagement reduces the undesired handle deployment stroke.

To this extent, the flap 15 comprises an engagement member 21 for engaging with the counter-engaging member 19, wherein the engagement member 21 is intended to engage the counter-engaging member 19 of the handle 13 or be placed on its way of displacement. The engagement member 21 may extend obliquely toward axle 5 to allow better cooperation with the counter-engaging member 19, as described more specifically below. The engagement member 21 may be disposed away from the hollow tube shaped 14 by a extending member 23. The flap 15 may be "L" shaped, as represented in FIGS. 1 and 2. Hence, flap 15 may comprise an extending member 23 and an engagement member 21 both in form of a wall. The extending wall 23 extends in direction of the counter-engaging member 19 when the flap system 1 is in the blocking position. According to the second embodiment, flap 15 may further comprise one or more reinforcing walls 24 stabilizing the relative position of the engagement member 21 to the extending wall 23. As represented in FIG. 2A, reinforcing walls 24 may be arranged at lateral sides of the flap 15 (corresponding to front and read sides once mounted in the motor vehicle).

When the user triggers the deployment of the handle 13 to the deployed position, for example by pushing on handle 13, tilting of the flap system (1, 1') causes flap 15 to step aside from the counter-engaging member 19 and from its way of displacement, allowing the handle 13 to be deployed by the deployment system 11.

The driving member 17 is an actuation mechanism, driving the tilting of the flap system (1, 1') about axle 5 and arranged to cooperate with the deployment system 11, and more particularly with the push lever 35 (FIG. 2B), of the handle 13 to space apart the flap 15 from the counter-engaging member 19 and its way of displacement. The displacement of the driving member 17 by the deployment system 11 causes the flap 15 to step aside allowing the handle 13 to be deployed and triggers the load of the reversible deformable member 7. The driving member 17 comprises an engagement part 25 cooperating with and driven by the deployment system 11. The driving member 17 may be "L" shaped, similar to the flap 15. Hence, driving member 17 may comprise an extending wall 27 and an engagement part 25 in form of a wall orthogonally disposed of, as represented. The extending wall 27 of the driving member 17 may extend orthogonally to the extending member 23 of the flap 15. By analogy, the engagement wall 25 of the driving member 17 may extend parallelly to the extending wall 23 of the flap 15. The free extremity of the engagement part 25 may be obliquely bevelled on a front side 26 to allow better cooperation with the deployment system 11, as described more specifically below. Hence, the oblique bevelled front side 26 extends on two perpendicular edges of the said free extremity. On the embodiment represented in FIG. 1, the rear side 28 of the free extremity of the engagement part 25 has a straight cutting edge and the front side has a chamfer 26. The upper edge of the free extremity of the engagement part 25 may also be progressively bevelled from the rear side 28 to the front side 26, as represented in FIG. 2A.

The reversible deformable member 7 is configured to withstand an acceleration of the body 3 rotation about the axle 5 up to 300 m/s$^2$. Accordingly, the reversibly deformable member 7 holds the flap system 1 in the blocking configuration during in particular a lateral crash accident. The reversible deformable member 7 may be fixed to or cooperate with the bracket 4 and the body 3. Body 3 may further comprise a retention member 29 in which one side of the helical coil spring 7 is arranged. To this purpose, the retention member 29 presents for example a U-shaped profile in cross section. This retention member 29 may extend along one side, notably along the rear side, of the extending wall 27 of the driving member 17. According to the second embodiment, the driving member 17 may further comprise one or more reinforcement walls 31 stabilizing the relative position of the retention member 29 to the extending wall 27, as represented in FIGS. 2A and 2B.

When the push lever 35 urges the driving member 17 toward the outside of the handle arrangement 9, the latter drives the spring 7 to be loaded, the body 3 to rotate about the axle 5 and the flap 15 to tilt in direction of the driving member 17, i.e. toward the inside of the handle arrangement 9, then moving the flap system 1 from the blocking configuration to the disengaged configuration.

Cooperation of the second embodiment of the flap system 1' and the deployment system 11 of the handle 13 will now be described for the rest (FIG. 3), intermediate (FIG. 4) and deployed (FIG. 5) positions of the handle 13 in the sight of FIGS. 3 to 6. This cooperation also applies to the first embodiment of the flap system 1. In these figures, the handle arrangement 9 is shown from inside the door or the backside. For better visualization, the bracket of the handle arrangement 9 has not been represented in FIGS. 3 to 5.

FIG. 3A represents the stowed position of the handle 13 and are represented the relative positions of the push lever 35, the steering lever 37 and the front lever 39.

The free rear end 33 of the handle 13 may comprise a nosepiece 32 extending toward the interior of the handle arrangement 9 and contacting a push-feed 34 in the stowed position of the handle 13.

The front lever 39 tends to hold the handle 13 in the stowed position by a reversibly deformable member (not represented).

The push lever 35 comprises a contacting arm 45 and an engaging arm 47. In the represented rest position, the contacting arm 45 is in contact with the grabbing part 49 of the handle 13, especially with the surface of the grabbing part facing the backside of the handle arrangement 9. The engaging arm 47 engages a contacting arm 38 of the steering lever 37 to prevent the steering lever 37 to rotate and to urge the handle 13. The push lever 35 is maintained in the rest position by means of a reversible deformable member 36, the latter being pre-stressed.

The steering lever 37 is arranged to push against a sliding part 43 of the handle 13 to make the latter pivot about the front lever 39. In that position, the steering lever does not exert any load force of the handle 13 by action of the push lever 35 against the contacting arm 38. The sliding part 43 of the handle 13 extends from the front extremity 41 and toward the inside of the handle arrangement 9.

The role of the flap system 1 is then here to prevent the rotation of the handle 13 about the front lever 39 in the absence of a loading force exerted by the steering lever 37 against the sliding part 43 of the handle 13.

The flap system 1 is arranged in front of the counter-engaging member 19 of the handle 13 and cooperates with the push lever 35 of the deployment system 11.

The counter-engaging member 19 may protrude downwardly from the sliding part 43. As represented, the counter-engaging member may be an add-on piece attached to the end of the sliding part 43 facing the backside of the handle arrangement 9. Alternatively, the sliding part 43 and the counter-engaging member 19 may be in one piece.

To that end, the push lever 35 comprises a housing 51 arranged in the engaging arm 47 in which is arranged the driving part 17 of the flap system 1. Housing 51 comprises an interior wall 53 facing the driving part 17 and intended to push against the letter for moving the flap system 1 from the blocking configuration to the disengaged configuration.

FIG. 3B represents the blocking configuration of flap system 1' in the stowed position of the handle 13. Flap 15 is here in front of the counter-engaging member 19, preventing its displacement. More particularly, the engagement member 21 of the flap is in front of the exterior surface 18 of the counter-engaging member 19. The oblique direction of the engagement member 21 of the flap 15 allows full contact with the counter-engagement member 19, since the latter does not deploy straightforward but in a rotational movement driven by the front lever 39. The driving member 17 is in front of the interior wall 53 of the housing 51. In that situation, one can understand that interior wall 53 prevents a rotation of body 3 in the wrong way since the driving member 17 is positioned closely, even in abutment, to the interior wall.

Hence, in case handle 13 deploys without an action of the user, the counter-engaging member 19 will engage the flap 15 causing the driving member 17 to exert a load force against the interior wall 53 which will be cancelled by action of the reversible deformable member 36. Hence the push lever will stay in position and prevents rotation of body 3 of flap system 1' about the axle 5. Consequently, undesired handle 13 deployment is stopped. In one embodiment of the invention, push lever 35 may be further prevented to rotate backwards by a stopper in direction of rotation given by the push load of the driving member 17 onto the interior wall 53.

FIGS. 4A and B represents an intermediate position of the handle 13 between the stowed and the deployed position, called hereafter the activating position. This activating position results from a push of the user on the free rear extremity 33 of the handle 13. Consequently, handle 13 has been moved toward the backside of handle arrangement 9 by rotation about the front lever 39. This action of the user triggered the deployment system 11. More specifically, the interior wall of the grabbing part 49 of the handle 13 pushed against the contacting arm 45 of the push lever 35, resulting in the rotation of the latter and its disengagement of the contacting arm 38 of the steering lever 37. The engaging arm 47 is then spaced apart from the contacting arm 38 of the steering lever 37, as represented, letting the latter to freely push against the sliding part 43, as described below. As a result of the movement of the handle 13, the contacting arm 38 of the steering lever 37 rotated backwards in direction of the backside of the handle 13 and is maintained in its position until the user stop pushing against the rear free extremity 33.

FIG. 4B represents the disengaged configuration of flap system 1' resulting from the activation position of the handle 13. As a result of the rotation of the push lever 37, the interior wall 53 of the housing 51 pushed against the driving member 17 causing tilting of the flap 15 and spacing the latter apart from the counter-engaging member 19 and its way of deployment. Because the movement of the housing 51 is circular, the contact angle between the interior wall 53 and the free extremity 25 of the driving member 17 evolves. Hence, the obliquely bevelled side 26 of the free extremity 25 of the driving member 17 allows continuous contact with the interior wall 51 while tilting about the axle 5. That improves the cooperation between said elements.

FIG. 5A represents the deployed position of the handle 13, wherein the rear free extremity 33 and the grabbing part 49 of the handle 13 are located at the exterior of the handle arrangement 9. The push lever 35 is configured to return to the rest position after a predetermined time period and not directly after reaching the active position. Hence the push lever 35 keeps the flap system 1 in the disengaged configuration until the handle 13 reaches the deployed position by action of the steering lever 37. This configuration let the steering lever 37 to urge the handle 13 and drives in rotation the front lever 39 until the contacting arm 38 reaches the engaging arm 45 of the push lever 35. The steering lever 37 tends to push against the sliding part 43 of the handle 13 by a reversible deformable member 40 until it is stopped by action of the push lever 35.

FIG. 5B represents the position of flap system 1 relative to the counter-engaging member 19 of the handle 13, wherein the latter moved above and went beyond flap 15. The flap system 1 is in the same configuration as represented in FIG. 4B.

Figure 6:
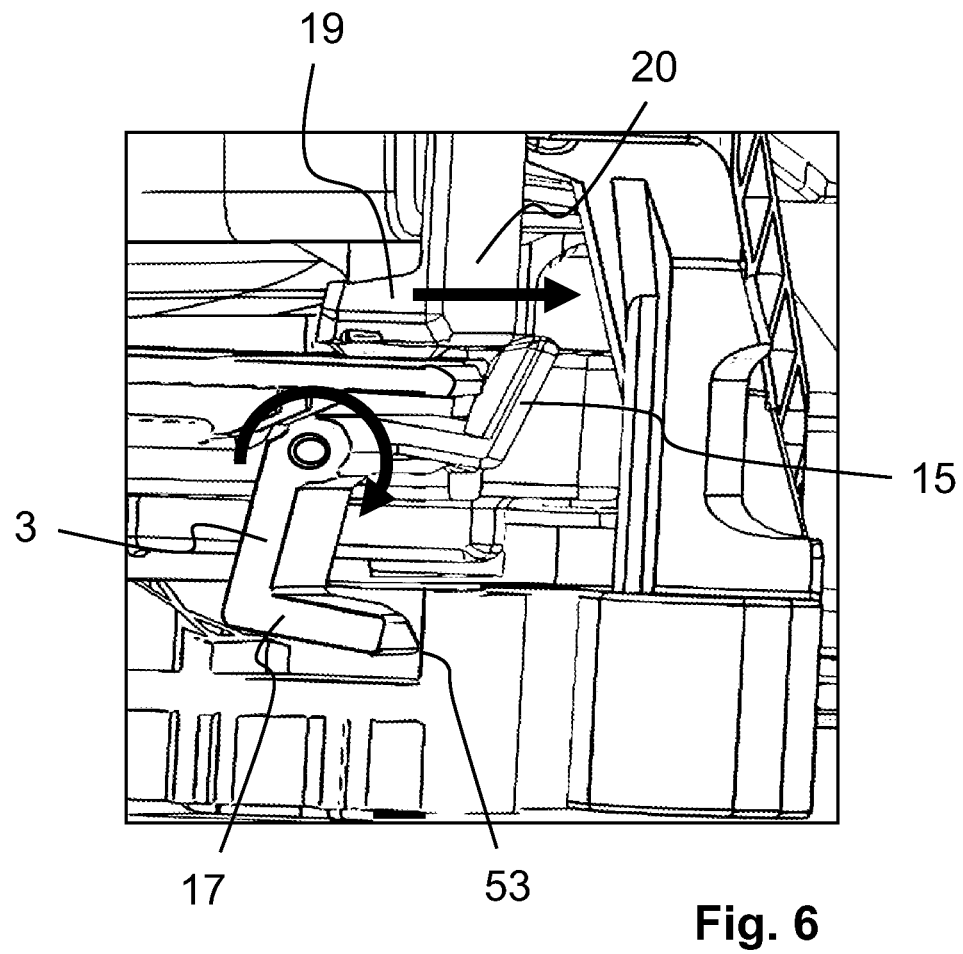
FIG. 6 is a sectional and detailed view of a handle arrangement comprising the flap system of FIG. 1 and a handle returning from a deployed position to a stowed position.

Then, handle 13 returns from the deployed position to the stowed position by the action of the reversible deformable member 36 of the push lever 35. This return can be slowed down by one or more dumpers 55. The engaging arm 47 brings the steering lever 37 back to the rest position by pushing against the contacting arm 38 in direction of the backside of the handle arrangement 9. As a result, driving member 17 of the flap system 1 is not pushed anymore by the interior wall 53 of the housing 51 and the flap system 1 returns passively to the blocking configuration by the action of the reversible deformable member 7. During this return, and as shown in FIG. 6, the counter-engaging member 19 will engage the flap 15 by an interior surface, causing the reversible deformable member 7 to deform, and the flap system 1 to tilt again to the disengaged configuration, letting the handle 13 to continue its course to the stowed position. After the counter-engaging member 19 has passed, the flap system 1 back again to the blocking configuration, facing the interior surface 18 of the counter-engaging member and in position to block the undesired deployment of the handle 13.

The invention claimed is:
1. A handle arrangement of a motor vehicle comprising:
a rotatably mounted handle moving from a stowed position, a deployed position, and an operative position in which the handle causes an unlatch of a door;

a flap system for impairing an undesired deployment of the handle of the handle arrangement, the flap system comprising a body, an axle and a reversibly deformable member, the body being rotatable around the axle and comprising a flap and a driving member,
  wherein the flap system rotates about the axle between a blocking configuration and a disengaged configuration, the reversibly deformable member maintaining the flap system in the blocking configuration, wherein the flap system moves to the disengaged configuration by actuation of the driving member triggering the deformation of the reversibly deformable member and the rotation of the body around the axle,
  wherein when the flap system is mounted in the handle arrangement and the flap is in the disengaged configuration, the flap is spaced apart from the handle to allow deployment of the handle, and wherein when the flap is in the blocking configuration, the flap faces the handle to prevent deployment of the handle; and
a deployment system of the handle configured to cause rotating of the flap system from the blocking configuration to the disengaged configuration by cooperation with the driving member, the deployment system comprising a push lever, a steering lever and a front lever, each pivotable about a respective axle,
wherein the handle is fixed to the front lever by a front extremity and being rotatable about the front lever,
wherein the steering lever is arranged to push against the handle to make the handle pivot about the front lever and move from the stowed position to the deployed position,
wherein the push lever comprises an engaging arm for preventing, in the stowed position, the steering lever to push against the handle, the engaging arm being spaced apart from the steering lever to let the handle moving from the stowed position to the deployed position,
wherein the engaging arm of the push lever comprises a housing into which the driving member is arranged,
wherein the flap system rotates forward about the axle to move from the blocking configuration to the disengaged configuration and backwards to return from the disengaged configuration to the blocking configuration,
wherein, in the blocking configuration, the driving member faces a wall of the housing preventing the flap system to rotates backwards about the axle, and
wherein the wall of the housing engages and pushes against the driving member when the engaging arm is spaced apart from the steering lever, causing the flap system to move from the blocking configuration to the disengaged configuration.

2. The handle arrangement according to claim 1, wherein the driving member is arranged to cooperate with a deployment system of the handle arrangement for actuating the titling of the flap system from the blocking configuration to the disengaged configuration when the flap system is mounted in the handle arrangement.

3. The handle arrangement according to claim 1, wherein the reversibly deformable member is arranged to cooperate with a bracket of the handle arrangement when the flap system is mounted in the handle arrangement.

4. The handle arrangement according to claim 1, wherein the reversibly deformable member is configured to resist rotation of the body about the axle at an acceleration of up to 300 m/s$^2$.

5. The handle arrangement according to claim 1, wherein the reversibly deformable member is a helical coil spring.

6. The handle arrangement according to claim 5, wherein the body comprises a retention member and one extremity of the helical coil spring is arranged in the said retention member, the retention member extending along with the driving member.

7. The handle arrangement according to claim 1, wherein the flap and/or the driving member is "L" shaped.

8. The handle arrangement according to claim 1, wherein the body has a core member which is hollow tube shaped and cooperates with the axle, the flap and/or the driving member extending from the core member.

9. The handle arrangement according to claim 8, wherein the flap and the driving member extend orthogonally from the core member of the body.

10. The handle arrangement according to claim 1,
  wherein the handle comprises a counter-engaging member,
  wherein the flap, in the blocking configuration of the flap system, faces the counter-engaging member causing the handle to be blocked in its stroke of rotation from the stowed position to the deployed position by the contact between the counter-engaging member and the flap,
  and wherein the flap, in the disengaged configuration of the flap system, is spaced apart from the counter-engaging member allowing the handle to move from the stowed position to the deployed position.

11. The handle arrangement according to claim 10, wherein the flap system is arranged to move from the blocking configuration to the disengaged configuration when the flap is pushed by the counter-engaging member of the handle returning from the deployed position to the stowed position.

* * * * *